(12) United States Patent
Place et al.

(10) Patent No.: US 7,383,758 B2
(45) Date of Patent: Jun. 10, 2008

(54) AIR-OPERATED END PREP MACHINE

(75) Inventors: Brent Place, Hager City, WI (US); Donato L. Ricci, Hager City, WI (US)

(73) Assignee: D.L. Ricci Corp., Red Wing, MN (US)

( * ) Notice: Subject to any disclaimer, the term of this patent is extended or adjusted under 35 U.S.C. 154(b) by 0 days.

(21) Appl. No.: 11/452,528

(22) Filed: Jun. 14, 2006

(65) Prior Publication Data

US 2007/0289422 A1 Dec. 20, 2007

(51) Int. Cl.
*B23B 5/16* (2006.01)
(52) U.S. Cl. .............................. 82/113; 82/128; 82/136
(58) Field of Classification Search .................. 82/113, 82/128, 131, 136
See application file for complete search history.

(56) References Cited

U.S. PATENT DOCUMENTS

| | | | | | |
|---|---|---|---|---|---|
| 4,667,548 | A | * | 5/1987 | Astle et al. | 82/113 |
| 4,677,884 | A | * | 7/1987 | Kwech et al. | 82/113 |
| 4,944,205 | A | * | 7/1990 | Ricci | 82/113 |
| 5,054,342 | A | * | 10/1991 | Swiatowy et al. | 82/113 |
| 5,429,021 | A | * | 7/1995 | Astle et al. | 82/123 |
| 5,549,024 | A | * | 8/1996 | Ricci | 82/113 |
| 5,603,250 | A | * | 2/1997 | Robinson | 82/56 |
| 6,189,425 | B1 | * | 2/2001 | Ricci et al. | 82/113 |
| 6,912,939 | B1 | * | 7/2005 | Place | 82/113 |
| 6,994,002 | B2 | * | 2/2006 | Moruzzi | 82/123 |
| 7,252,025 | B2 | * | 8/2007 | Place et al. | 82/113 |

\* cited by examiner

*Primary Examiner*—Willmon Fridie, Jr.
(74) *Attorney, Agent, or Firm*—Quarles & Brady LLP

(57) ABSTRACT

An end prep tool with a pneumatically driven tool slide assembly comprises a mandrel mountable to the internal diameter of a tubular work piece. Mounted on the mandrel are a rotational head assembly and a rotatable housing that are longitudinally displaceable along the mandrel. The rotational head assembly carries either one or two tool feed assemblies thereon for orbital movement around the work piece. The tool slide assemblies are driven by a pneumatic motor to provide a true phonographic finish with no tripper marks.

6 Claims, 6 Drawing Sheets

AIR-OPERATED END PREP MACHINE

BACKGROUND OF THE INVENTION

I. Field of the Invention

This invention relates generally to tools for refinishing a work piece and more particularly, to an internally mounted end prep tool that can be rapidly set up and used in the field to accurately machine flat or beveled surfaces on pipe flanges, valves, fittings and pipe ends within close tolerance ranges.

II. Discussion of the Prior Art

Portable end prep tools are generally known in the art. Industrial tubing is found in refineries, pipelines, steam plants or the like. End prep tools are used to prepare industrial tubing for welding by cutting, machining and/or beveling the end of the tube. Prior art end prep machines mount or clamp to the inside surface of the work piece with an adjustable mandrel. Mounted on the mandrel is an annular housing supporting a gear ring carrying either one or two tool feed assemblies thereon for orbital and radial movement of the cutting tool relative to the work piece. In the U.S. Pat. No. 4,799,409, a drive mechanism is operatively coupled between the gear ring and the feed tool assembly. The drive means included a gear box assembly having a forward, reverse and neutral position, as well as a mechanism for varying the speed of rotation of the feed screw in the tool slide assembly.

While the prior art end prep lathes are useful for refurbishing work pieces, reliance on tripper mechanisms to advance the cutting tool does not always lead to a true phonographic finish to the work piece. A need therefore exists for an end prep tool that results in safe, rigid and accurate on-site machining. The present invention is an improvement over the prior art by providing a feed tool assembly capable of providing a true photographic finish to a work piece.

SUMMARY OF THE INVENTION

In accordance with one aspect of the present invention, an end prep tool is provided for machining the end of a pipe. The tool includes a mandrel for centering and internally mounting the tool to a theoretical center of a pipe. The mandrel has an annular member and a stem extending from the annular member. The stem further includes a longitudinal slot. The annular member is adapted to concentrically mount the mandrel to the inside diameter of the pipe. The stem member is captured by an annular hub concentrically disposed on the stem member. A reciprocal key assembly mates with the longitudinal slot of the stem to prohibit longitudinal displacement of the hub. A rotatable assembly is journaled for rotation about the hub, wherein said rotatable assembly comprises a rotary union carrying a head assembly, wherein said head assembly includes a pair of radially projecting arms and at least one, preferably two, slide assemblies are disposed at the end of each arm. The slide assembly includes a slide plate with a threaded feed screw journaled for rotation therein. The feed screw carries a feed nut and a tool block engaged by the feed nut. When the feed screw is rotated, the feed nut displaces the tool block relative to the slide plate. Furthermore, the tool slide assembly is positionable at a desired angle relative to the head assembly. A motor, preferably an air motor, is coupled to the feed screw for rotating the feed screw of the tool slide assembly. A stationary housing abuts the rotatable assembly. The stationary housing houses a drive gear ring operatively coupled to the rotating assembly. A slot is cut into the stationary housing exposing a portion of the gear ring. An electric, pneumatic or hydraulic motor is mounted on the stationary housing, wherein said motor drives the gear ring such that rotation of the gear ring rotates the rotatable assembly. An axial feed tube extends from an opposing surface of the stationary housing to axially position the end prep tool relative to a work piece.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in several views refer to corresponding parts.

DESCRIPTION OF THE PREFERRED EMBODIMENT

Figure 1:
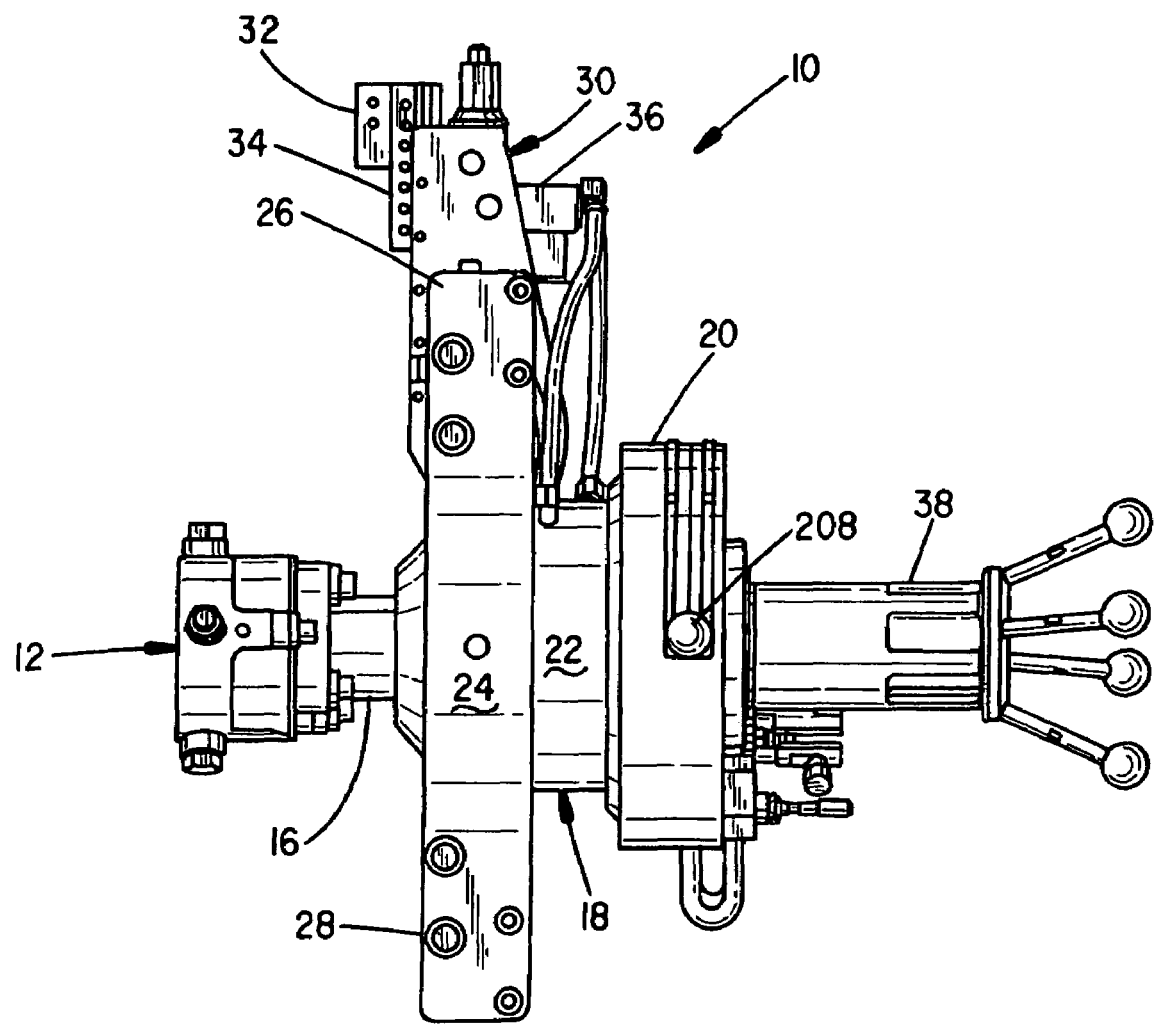
FIG. 1 is a side perspective view of the end prep tool constructed in accordance with the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above, specifically mentioned, derivatives thereof and words of similar import.

FIG. 1 is a perspective view of the preferred embodiment of the end prep tool of the present invention. The end prep tool is generally designated by the numeral 10. The mounting mandrel clamping assembly 12 includes a base member 14 and the stem member 16. The stem member 16 supports the rotatable assembly 18 and the stationary housing 20 thereon. The rotatable assembly 18 comprises a rotatable housing 22 supporting a head assembly 24. The head assembly 24 has two opposing bifurcated arms 26, 28 for holding a tool slide assembly 30. FIG. 1 shows only one tool slide assembly 30 supported in bifurcated arms 26; however, an identical tool slide assembly may be disposed in bifurcated arms 28. The tool slide assembly 30 comprises a tool block 32 mounted on a slide plate 34. An air motor 36 is operatively coupled in a way yet to be described to the tool slide assembly 30 to translate the tool block 32 along the slide plate 34. Extending from the stationary housing 20 is an axial feed tube 38 for positioning the end prep tool 10 relative to the work piece.

Figure 2A:
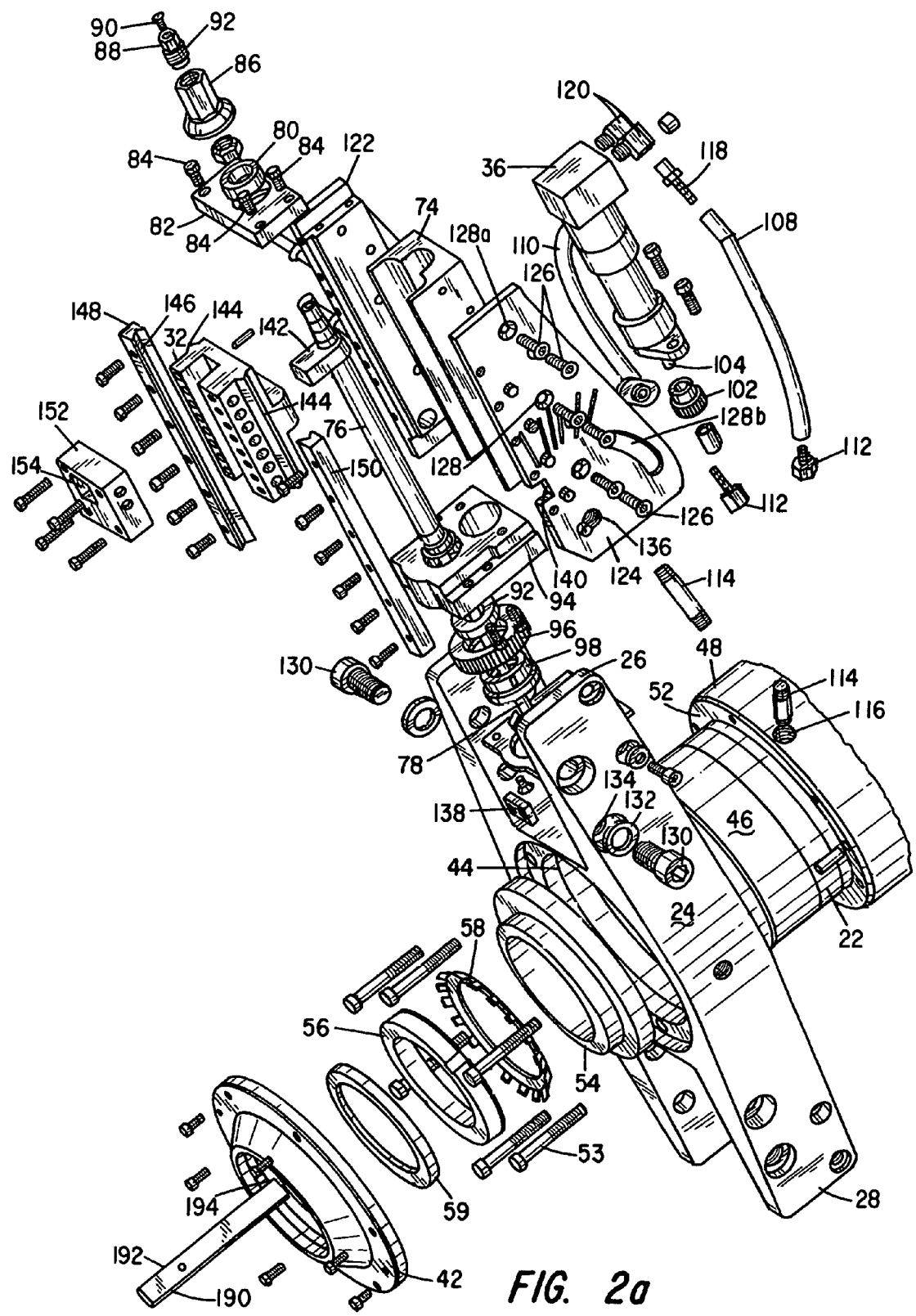
FIG. 2 is an exploded assembly drawing of the tool of FIG. 1.
Figure 2B:
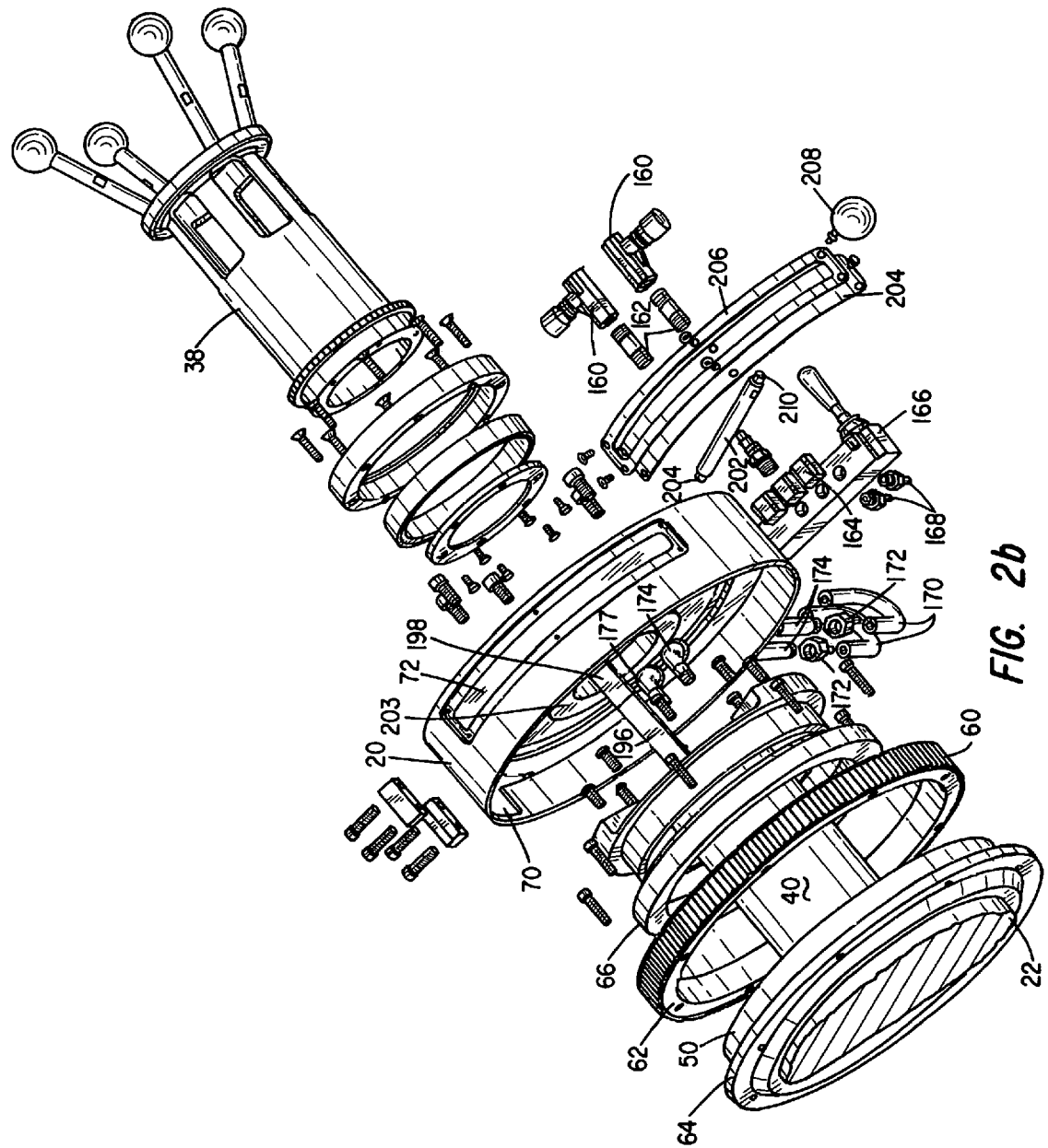
Figure 4:
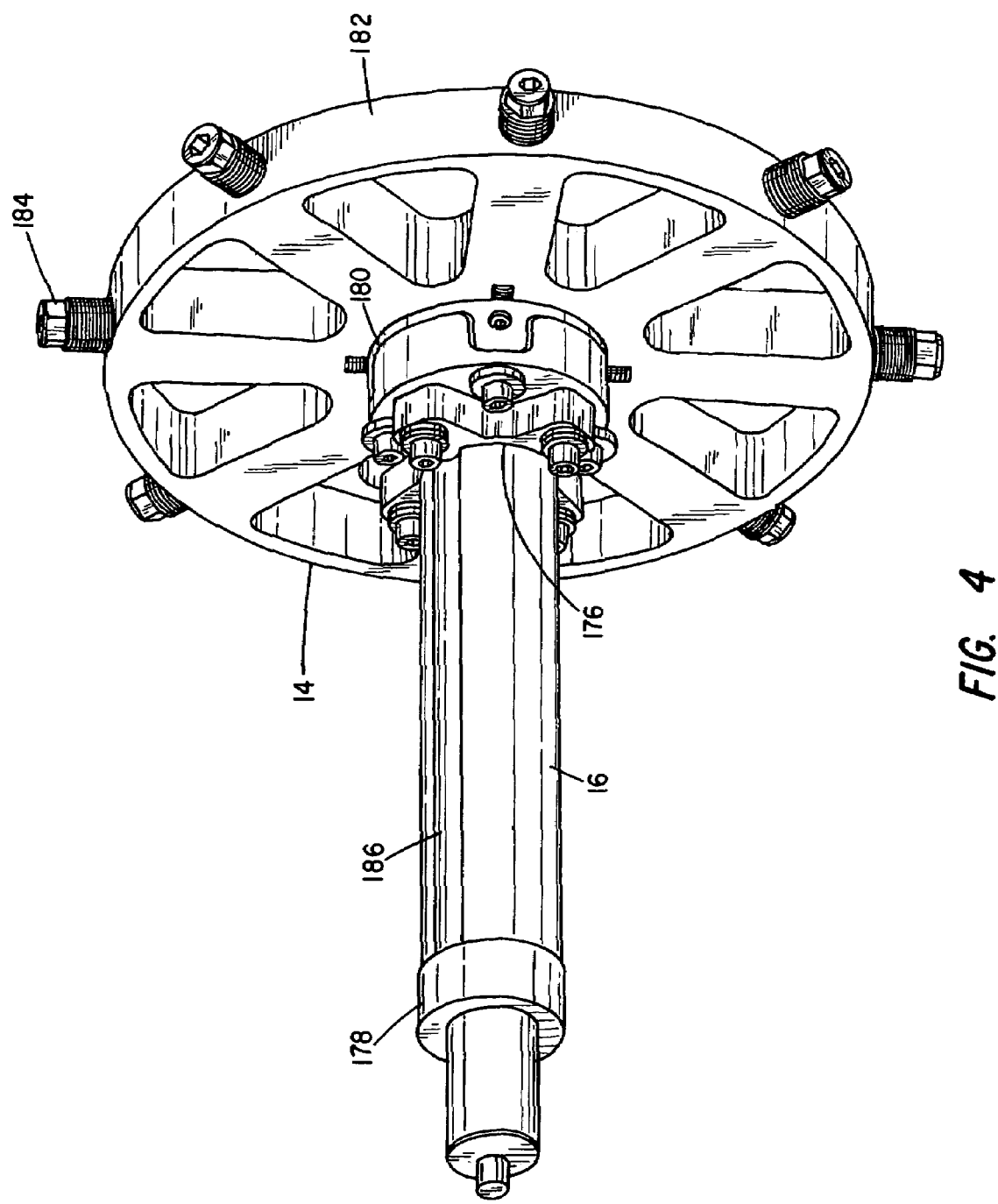
FIG. 4 is a perspective view of the mandrel assembly used in the tool of FIG. 1.

FIG. 2 shows an exploded view of the end prep tool 10 and FIG. 4 is a perspective view of the mandrel clamping assembly 12. To anchor the stem member 16 of the mandrel clamping assembly to the air operated end prep machine 10, the stem 16 is inserted into an annular hub member 40 through an end cap 42 and a central opening 44 in the head assembly 24. A rotary union 46 is arranged to spin about the stationary annular hub member 40. The head assembly 24 slides over the rotary union 46 and is fastened to the rotatable housing 22. The rotatable housing 22 has a first end 48 and a second end 50. At the first end 48 is an annular face member 52 and the head assembly 24 is coupled to the rotatable housing 22 at said annular face member 52 by socket head cap screws 53 extending through holes in head assembly 24 and into tapped holes in annular face member 52.

To reduce friction between the head assembly 24 as it rotates about the union 46 a Timken self-adjusting bearing 54 is disposed between the union 46 and the end cap 42 inside the central opening 44 of the head assembly 24. A lock nut 56 and lock washer 58 cooperate to lock the Timken bearing 54 in the central opening 44. An elastomeric oil seal ring 59 is disposed between the end cap 42 and the lock nut 56.

To rotate the head assembly 24 a gear ring 60 is provided having a first face 62. The first face 62 is fastened to an annular flange 64 protruding from the rotatable housing 22 proximate its second end 50. A second Timken bearing 66 reduces friction between the hub 40 and the rotatable housing 22 as the rotatable housing spins on the hub. The annular stationary housing member 20 has a first slot 70 (partially obscured by the sidewall of the stationary housing member 20 in FIG. 2), and a second elongated arcuate slot 72. The first slot 70 exposes a portion of the teeth of the gear ring 60. A motor (not shown) mounted on the housing member 20 has a spin gear for driving the gear ring 60, thus rotating the housing 22 and in turn rotating the head assembly 24.

Figure 5:
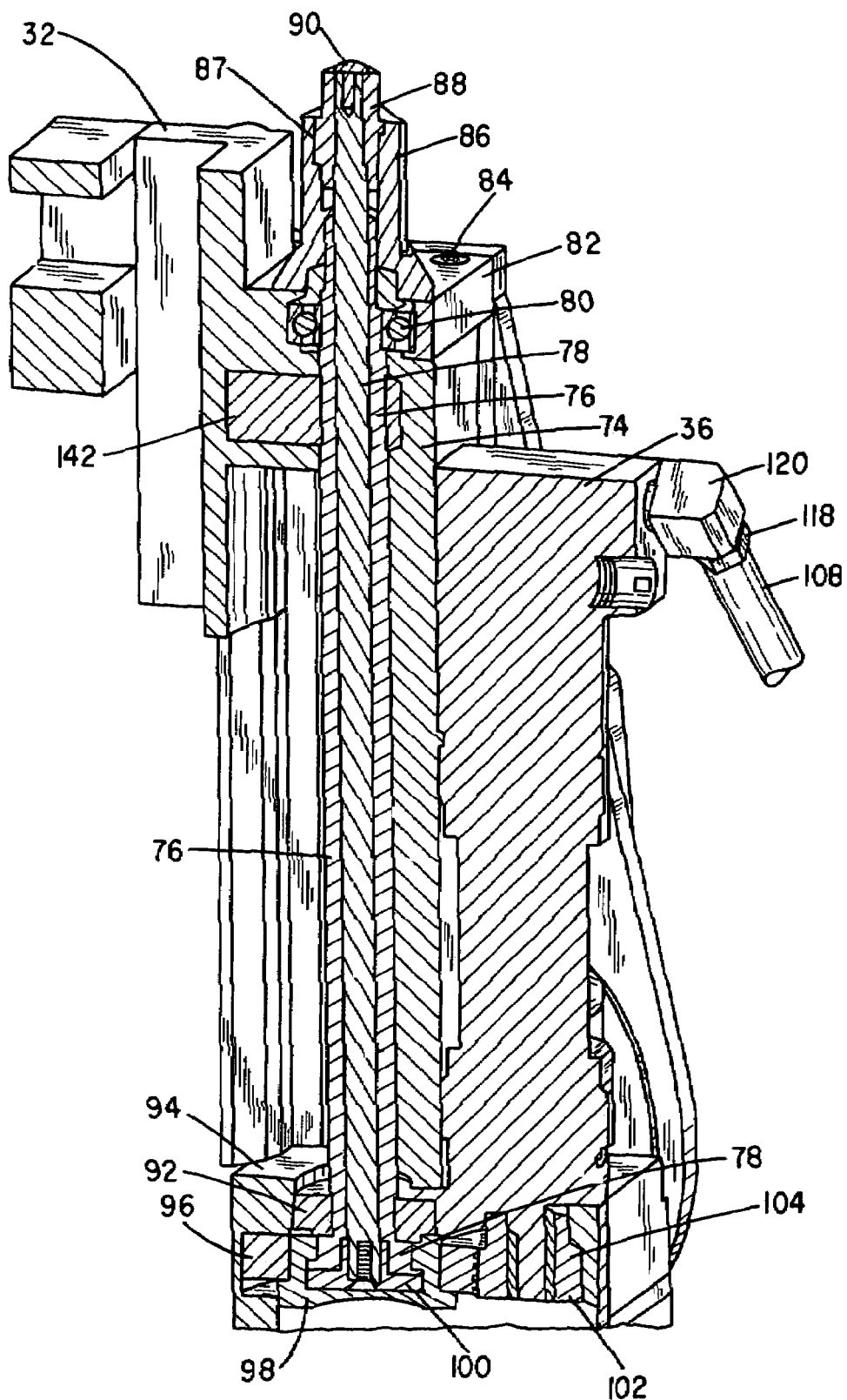
FIG. 5 is an exploded perspective view of the slide assembly used in the tool of FIG. 1.

Referring both to FIGS. 2 and 5, an explanation will now be given of the construction of the tool slide assembly 30 of FIG. 1. As described above, the end prep tool 10 may have either one or two tool slide assemblies. Where there are two, the slide assemblies may be identical. Each includes a slide 74 having a tubular, cylindrical feed screw 76 with a threaded exterior and journaled for rotation within the slide. A center rod 78 extends longitudinally through the feed screw 76. A bearing 80 fits about a non-threaded end portion of the feed screw 76 and is held in place by bearing bracket 82 that fastens to the top of the slide 74 by screws, as at 84. Keyed to an outwardly extending portion of the feed screw 76 is a ratchet nut 86 having a hex profile permitting manual rotation of the feed screw 76 with this aid of a wrench or the like. An outwardly extending portion of the center rod 78 is keyed to a locking nut 88 by a top fastener 90. The locking nut 88 has a threaded end 87 that cooperates with a threaded interior surface of the ratchet nut 86.

The opposite end of the feed screw 76 are also unthreaded and pass through a Timken bearing 92 supported in a bottom bracket 94 that also bolts to the slide 74. A spur gear 96 is secured to the end of the feed screw 76 by a feed screw lock bushing 98 keyed to the spur gear 96.

The spur gear 96 is adapted to mesh with a corresponding air motor drive gear 102 affixed to a drive shaft 104 of an air motor 36. Compressed air is provided to the pneumatic motor 36 by a first and second hoses 108 and 110. Both hoses 108, 110 have a first and second ends, the first end having a female hose barb 112 mating with a nipple 114. The nipple 114 is inserted into an air supply aperture 116 in the rotatable housing 22. A male pipe barb 118 is coupled to the second end of the hoses and mates with an elbow 120 which is inserted into the air inlet and air outlet ports of the pneumatic motor 36.

Secured to opposite sides of the slide 74 are a left side bracket 122 and a right side bracket 124. The right side bracket 124 is pivotally secured to the slide 74 by means of a plurality of flat head screws 126 that pass through a bores 128a in the bracket 124 and into a threaded bores in the slide 74. The right side bracket 124 further includes an arcuate slot 128b. The tool slide assembly is secured to the head assembly 24 by clamping bolts 130 passing through washers 132, and a bore 134 formed through the head assembly 24 and into a threaded bore 136 in the right side bracket 124. Slide lock 138 is fastened to the head assembly 24 and is captured by a peripheral slot 140 cut into the right side bracket 124.

A feed nut 142 is threaded onto the feed screw 76 and is adapted to cooperate with the tool block 32. The tool block 32 includes a longitudinal v-shaped projection 144 for engaging a corresponding v-shaped groove 146 on gibs 148, 150. Thus, as the feed screw 76 is rotated, the tool slide 32 will be displaced longitudinally along the slide 74 in a direction depending upon the direction of rotation of the feed screw. A tool block cap 152 bolts to the tool slide 32. A cutting tool bit (not shown) is adapted to be clamped in a rectangular recess 154 formed in the tool cap 152.

To supply compressed air to the pneumatic motor, compressed air is pumped into the tool at control valve 166. The flow control valves 160 control the motor speed by restricting the exhaust air flow where the flow control valves 160 have nipple members 162 connecting the flow control valves 160 to a 90° elbow 164. The 90° elbows 164 connect to a 3 position, 4-way valve 166 which controls the compressed air flow into the air motor 36. A male hose barb 168 connects the 3 position valve 166 to a second hose 170, and the second hose 170 is connected by a female hose barb 172 to a nipple 174 that connects to a street elbow 177. The compressed air is then delivered to the nipples 114 through annular passageways 175 (FIG. 3) embedded in the union 46 from the street elbow 174.

FIG. 4 is a perspective view of the mandrel on which the end prep machine mounts. The large diameter mandrel has a base member 14 and stem member 16. The stem member 16 has a first end 176 and a second end 178 with the base member 14 attached proximate the first end 176. The base member 14 comprises a first (inner) annular member 180 having a first diameter and a second (outer) annular member 182 having a second diameter larger than the first diameter. Said second annular member 182 is disposed concentrically around the first annular member 180. The second annular member 182 can be removed from the first annular member 180 depending on the diameter of the work piece to be machined. A plurality of equally spaced threaded bolts 184 project radially outward from the periphery of the second annular member 182 for engaging the inside diameter of a tubular work piece. By selectively adjusting the amount of extension of the individual bolts 184, the mandrel shaft 16 can be made concentric with the work piece.

The stem member 16 has a longitudinal slot 186 extending approximately from the first end 176 to proximate the second end 178.

Figure 3:
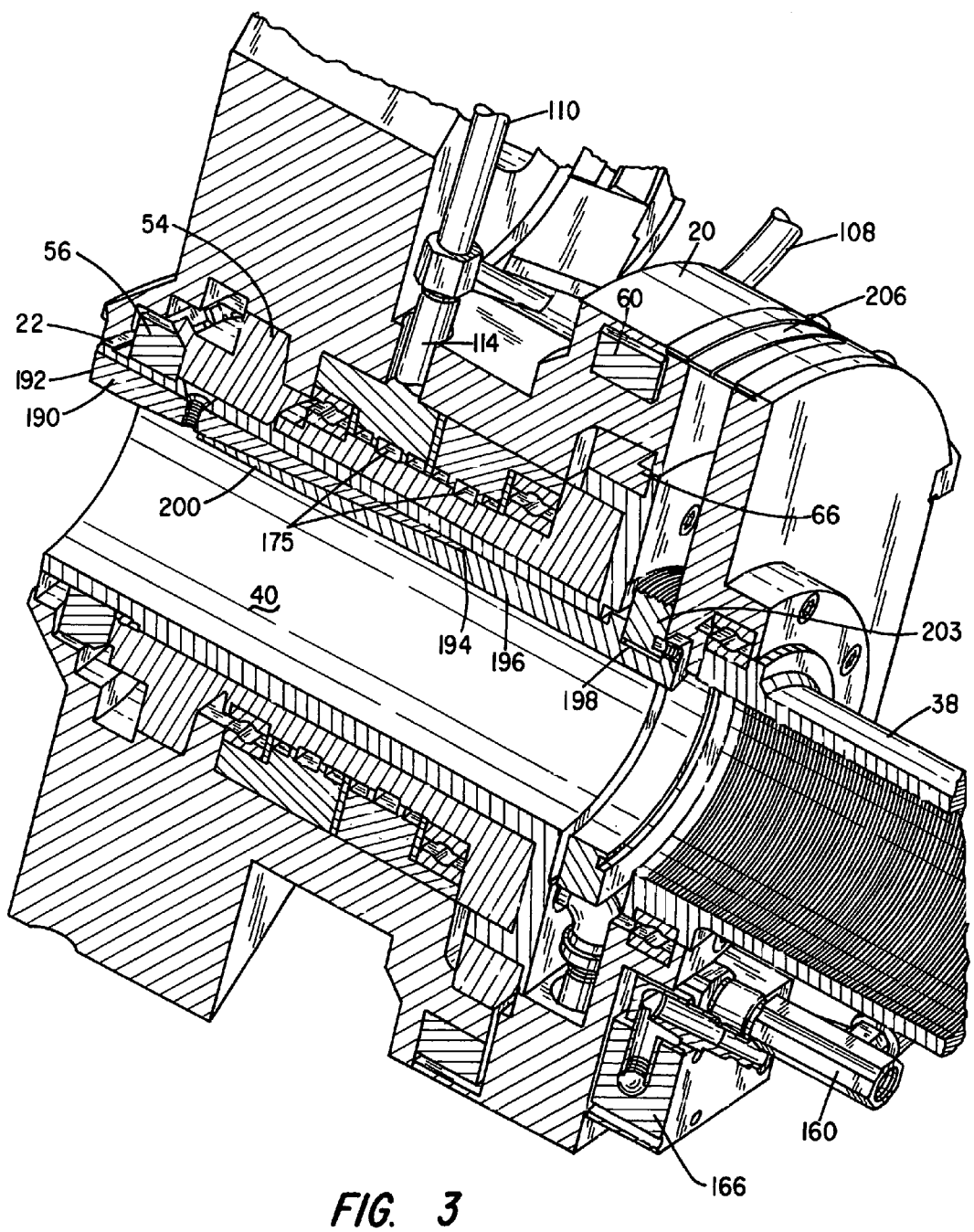
FIG. 3 is a partial, perspective cross-sectional view of the tool of FIG. 1.

As described above, the stem member 16 is inserted into the annular hub member 40. A stationary key 190 is disposed on the inside diameter of the hub 40 and mates with the longitudinal slot 186 in the mandrel. The stationary key 190 has a first end 192 and a second tapered end 194 (FIG. 3). A displaceable key member 196 cooperates with the stationary key member 190. The displaceable key member 196 is also tapered from a first end 198, and a second end 200. The tapered portion of the displaceable key member 196 slides on the tapered portion 194 to selectively lock and unlock the hub 40 with respect to the mandrel stem 16 to prohibit longitudinal displacement of the stem 16.

A key lock shaft 202 having a knob grip 208 is operatively coupled to an annular nut 203 after passing through slot 72 in the housing 20. As seen in FIG. 3, movement of the nut 203 to the left wedges key 194 into the slot 186 of the mandrel shaft. Likewise rotation of the annular nut 203 to the right in FIG. 3, using the handle 202, 208 removes the wedging force, allowing the mandrel shaft to be repositioned.

In operation, the mandrel assembly illustrated in FIG. 4, properly sized for a pipe whose flange is to be machined is inserted into the I.D. of that pipe and the jack screws 184 are adjusted so that the shaft 16 is concentric with the work piece pipe. Next, the end prep machine 10 is slid onto the shaft 16 and locked in place by rotating the handle 208 to thereby rotate the annular lock nut 203 causing the movable key 194 to slide to the left as shown in FIG. 3, riding upon the stationary key member 190. As pointed out above, this action serves to wedge the key 194 relative to the slot 186 in the mandrel shaft 16 thereby locking the end prep machine 10 firmly onto the mandrel.

Next, the angle of the cutting tool carried by the tool block can be adjusted to accommodate any taper that the work piece pipe flange may have by tilting the side plates 122 and 124 and subsequently tightening the bolts 130 to maintain that angle. A drive motor (not shown) having an output shaft with a gear for meshing with the spur gear 60 will now cause the housing 64 to rotate about the stationary hub 40 and thereby carrying the head member 24 and the tool slide assembly 30 with it in an orbital path.

By manipulating the valves 160, air under pressure is introduced into the stationary portion of the rotary air union 46 and the air is made to flow through the passageways 175 leading to the nipples 114 carried by the rotatable housing 50. The air hoses 108 and 110 connect to those nipples and air, under pressure, is thus applied to the air motor 36 to thereby drive the gear 102 that is arranged to mesh with the spur gear 96 that is keyed to the feed screw lock bushing 98.

The feed screw lock bushing has an octagonal-shaped pocket that is adapted to mate with a correspondingly shaped feed screw lock coupler 100 affixed to the lower end of the tubular feed screw 76.

When the central rod 78 is elevated by lifting the locking nut 88 away from the bracket 82, the air motor 36 is able to drive the lead screw 76 to thereby displace the tool block 32 in a radial direction. However, when the locking nut 88 is pushed down toward the bracket 82, the feed screw lock coupler 100 no longer engages the feed screw lock bushing 98 such that the feed screw 76 is no longer driven by the air motor 36.

It can be appreciated, then, that as the tool block 32 carrying the tool bit orbits and at the same time is made to move radially, the tool bit will trace a helical path like that observed on a phonograph record and since the feed screw 76 moves continuously, there will not be step marks created on the flange of the work piece of the type that result when a star wheel and tripper mechanism are employed to rotate a lead screw controlling movement of the tool bit.

This invention has been described herein in considerable detail in order to comply with the Patent Statutes and to provide those skilled in the art with the information need to apply the novel principles and to construct and use such specialized components as are required. However, it is to be understood that the invention can be carried out by specifically different equipment and devices and that various modifications, both as to equipment details and operating procedures, can be accomplished without departing from the scope of the invention itself.

What is claimed is:

1. An end prep tool for machining the end of a work piece having an inside diameter, an outside surface and an end flange on at least one end of the work piece, said tool comprising:
    a) a mounting mandrel centering and internally mounting the tool to a theoretical center of the work piece, said mounting mandrel including a stem member having a first and second end, a longitudinal slot extending from the first end to proximate the second end, and a first annular member proximate the first end;
    b) a rotational head assembly having a central opening adapted to receive said stem member and opposing bracket members;
    c) a first tool slide assembly having a slide with a threaded feed screw journaled for rotation therein, the feed screw carrying a threaded feed nut, a tool block slidably mounted on the slide and engaged by the feed nut such that rotation of the feed screw displaces the tool block relative to the slide, and a pneumatic motor operatively coupled to the feed screw for rotating the feed screw;
    d) a rotatable housing having a first end and a second end, wherein the rotational head assembly is coupled to the rotatable housing proximate the first end;
    e) a gear ring having a first face operatively coupled to the second end of the rotatable housing; and
    f) a motor means driving the gear ring such that rotation of the gear ring rotates the rotatable housing.

2. The end prep tool of claim 1 wherein the pneumatic motor includes a drive shaft journaled by the pneumatic motor and a motor drive gear affixed to said drive shaft, wherein the motor drive gear meshes with a spur gear coupled to the threaded feed screw.

3. The end prep tool of claim 2 wherein the spur gear is coupled to the feed screw by a lock bushing keyed to the spur gear by a feed screw coupler.

4. The end prep tool of claim 1 wherein the tool slide assembly further includes a first and second mounting brackets pivotally affixed to opposed side surfaces of the slide.

5. The end prep tool of claim 1 wherein the rotatable housing further includes a compressed air passage directing to the pneumatic motor, said compressed air passage including an inlet fitting on the rotatable housing connectable to a supply of compressed air and a conduit having one end communicating with the inlet fitting and an opposite end communicating with the pneumatic motor, whereby compressed air from the inlet fitting can flow through the conduit to the pneumatic motor and power the same.

6. The end prep tool of claim 1 wherein a reciprocal key assembly capable of mating with the longitudinal slot in the mandrel substantially prohibits longitudinal displacement of the head assembly along the mandrel.

* * * * *